United States Patent Office 3,034,366
Patented May 15, 1962

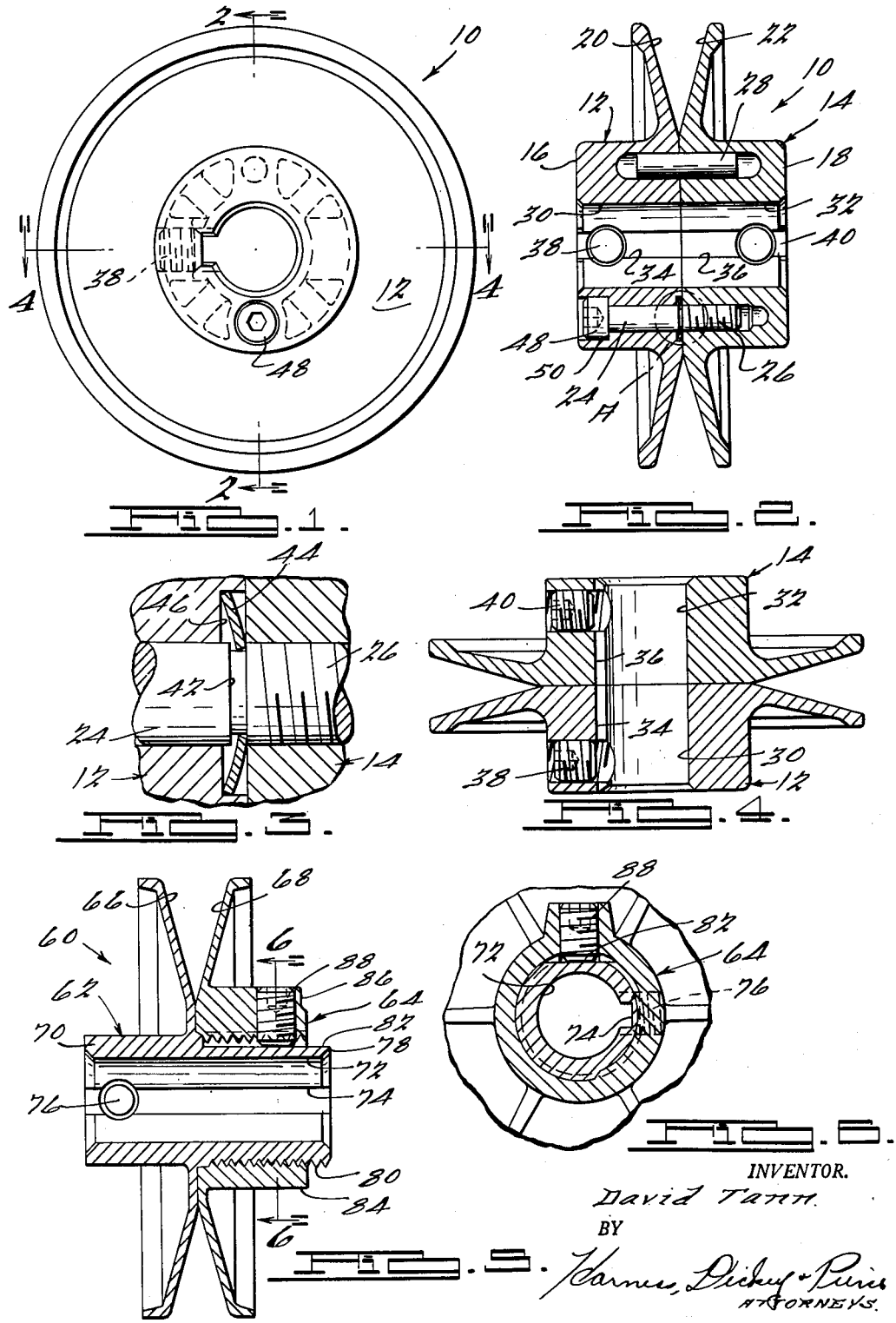

3,034,366
VARIABLE PITCH PULLEY
David Tann, Detroit, Mich., assignor to Tann Corporation, Detroit, Mich., a corporation of Michigan
Filed Feb. 1, 1960, Ser. No. 6,020
1 Claim. (Cl. 74—230.17)

This invention relates to pulleys and particularly to a variable pitch pulley having two relatively adjustable pulley halves.

It is one object of the present invention to provide a variable pitch pulley comprising two pulley halves that can be readily advanced and retracted axially relative to one another to vary the pitch of the pulley.

It is another object of the invention to provide a variable pitch pulley of the type described above wherein each pulley half can be independently affixed to a common shaft after they have been adjusted axially relative to one another.

It is a further object of the invention to provide a variable pitch pulley which is economical to manufacture, rugged and efficient in use, and easy to adjust, assemble and disassemble.

Other objects and features of novelty of the invention will be specifically pointed out or otherwise become apparent when referring, for a better understanding of the invention, to the following description taken in conjunction with the accompanying drawings wherein:

FIGURE 1 is a plan view of a variable pitch pulley embodying features of the present invention;

FIG. 2 is a sectional view of the pulley illustrated in FIG. 1 taken along the line 2—2 thereof;

FIG. 3 is an enlarged fragmentary sectional view of the structure of FIG. 2 within the circle indicated by the letter "A";

FIG. 4 is a sectional view of the structure illustrated in FIG. 1 taken along the line 4—4 thereof;

FIG. 5 is a sectional view of a variable pitch pulley embodying other features of the present invention; and FIG. 6 is a sectional view of the structure illustrated in FIG. 5 taken along the line 6—6 thereof.

Referring to FIGS. 1-4, a variable pitch pulley 10 embodying features of the present invention is illustrated which is comprised of two pulley halves 12 and 14. The pulley halves 12 and 14 have hub portions 16 and 18 and tapered annular flanges 20 and 22, respectively. The hub portions are coaxially aligned with one another and are secured together by a bolt 24 having a threaded end portion 26 which threadably engages the hub portion 18. A dowel pin 28 also interconnects the pulley halves 12 and 14 to assist in maintaining them in accurate alignment.

The hub portions 16 and 18 have central bores 30 and 32 of the same diameter with aligned key slots 34 and 36 therein for receiving a key secured to a shaft (not shown) upon which the pulley 10 is adapted to be mounted. The hub portions 16 and 18 are also provided with set screws 38 and 40, respectively, which are adapted to be adjusted radially in a conventional manner and are aligned with the key slots 34 and 36, respectively, in position to engage the key secured to the shaft in a manner to prevent axial movement of each of the hub portions relative to the shaft.

As most clearly illustrated in FIGS. 2 and 3, the stud 24 is provided with an annular groove 42, and a Belleville washer 44 is secured within the annular groove with the outer peripheral portion thereof disposed within a counterbore 46 in the face of the hub portion 16. The construction is such that the Belleville washer 44 resiliently urges the stud 24 axially to the right to maintain an enlarged head 48 on the left end of the stud in engagement with an annular shoulder 50 on the hub portion 16. It will be observed that the Belleville washer 44 and annular groove 42 both lie behind the right face of the hub portion 16 to enable the hub portions to abuttingly engage one another as illustrated.

When the pulley halves are mounted on a shaft with the set screws 38 and 40 tightly clamped against the key secured to the shaft, the pitch of the pulley may be adjusted by loosening one or the other, or both, of the set screws 38 and 40 and rotating the stud 24. The enlarged head 48 of the stud is adapted to receive an Allen wrench to facilitate the rotation thereof. It will be observed that the stud 24 is free to rotate relative to the hub portion 16 but cannot move axially relative thereto because of the Belleville washer 44, and that the rotation of the stud relative to the hub portion 18 will separate the pulley halves axially from one another. After the pulley halves have been separated the desired distance to space the tapered flanges 20 and 22 so as to provide the desired variation in pitch, the set screw or set screws which have been loosened can again be tightened to again fix each of the pulley halves axially relative to the shaft on which they are mounted.

Referring to FIGS. 5 and 6, a variable pitch pulley 60 embodying other features of the present invention is illustrated comprising two pulley halves 62 and 64 each having tapered annular flanges 66 and 68 which cooperate to form a pulley groove for a V-belt. The pulley half 62 has a hub portion 70 with a central bore 72 therein. An axially extending key slot 74 is formed in the central bore and a set screw 76 is provided which is similar to the set screws 38 and 40 and is adapted to engage a key secured to the shaft (not shown) to fix the pulley 60 axially relative to the shaft as previously described. The projecting right end 78 of the hub portion 70 has external threads 80 thereon and an axially extending flat portion 82. The pulley half 64 comprises a hub portion 84 from which the tapered annular flange 68 extends and is internally threaded so that it can be screwed on to the external threads 80 on the right end of the hub portion 70. A land 86 projects from the hub portion 84 to provide sufficient material for receiving a set screw 88 adapted to clamp against the flat portion 82 to prevent rotation of the pulley half 64 relative to the pulley half 62.

With this construction the pulley halves 62 and 64 can be separated axially by retracting the set screw 88 far enough to enable the pulley half 64 to be rotated relative to the pulley half 62, the threaded engagement therebetween moving the pulley half 64 axially as it is rotated. When the pulley halves have been separated the necessary distance to provide the desired pitch for the pulley 60, the pulley half 64 is rotated slightly in one direction or the other to align the set screw 88 with the flat portion 82, and the set screw is clamped thereagainst to prevent further rotation between the pulley halves. Of course, the axial position of the pulley 60 on the shaft can be readily adjusted if necessary, by retracting the set screw 76, to enable the pulley 60 to be moved axially to any desired position, and then advancing the set screw to clamp the key as previously described.

While it will be apparent that the preferred embodiments herein illustrated are well calculated to fulfill the objects above stated, it will be appreciated that the invention is susceptible to modification, variation and change without departing from the proper scope or fair meaning of the subjoined claim.

What is claimed is:

A variable pitch pulley comprising two pulley halves, each having a hub portion with a central bore extending therethrough and a tapered annular flange extending radially therefrom, means for adjustably securing said pulley halves together with said tapered flanges in position to cooperate to provide a pulley groove, and means for releasably fixing each of said pulley halves to a common shaft adapted to extend through the central bores thereof, said first mentioned means including a stud rotatably mounted in one of said pulley halves against axial movement relative thereto and threadably engaging the other of said pulley halves, said stud having an enlarged head on one end thereof and a threaded portion on the other end thereof, the stud extending through said one pulley half with the enlarged head engaging the one pulley half in a manner to limit axial movement of the stud toward the other pulley half, the threaded portion of the stud threadably engaging the other pulley half, and resilient means disposed between said one pulley half and said stud to resiliently bias the stud toward the other pulley half.

References Cited in the file of this patent

UNITED STATES PATENTS

| | | |
|---|---|---|
| 2,135,214 | Moore | Nov. 1, 1938 |
| 2,209,737 | Livingston | July 30, 1940 |
| 2,633,031 | Browning | Mar. 31, 1953 |
| 2,635,474 | Hennings | Apr. 21, 1953 |
| 2,657,584 | Williams | Nov. 3, 1953 |
| 2,718,155 | Firth | Sept. 20, 1955 |
| 2,857,771 | McClockey | Oct. 28, 1958 |
| 2,870,641 | Bellmann et al. | Jan. 27, 1959 |
| 2,890,592 | Keepers | June 16, 1959 |
| 2,907,597 | Williams | Oct. 6, 1959 |
| 2,973,656 | Kurre | Mar. 7, 1961 |